United States Patent [19]

Rees

[11] Patent Number: 5,006,774
[45] Date of Patent: Apr. 9, 1991

[54] TORQUE ANGLE CONTROL SYSTEM FOR CONTROLLING THE TORQUE ANGLE OF A PERMANENT MAGNET SYNCHRONOUS MOTOR

[75] Inventor: Fenton Rees, Ann Arbor, Mich.

[73] Assignee: Sundstrand Corporation, Rockford, Ill.

[21] Appl. No.: 492,120

[22] Filed: Mar. 13, 1990

[51] Int. Cl.$^5$ .............................................. H02P 7/42
[52] U.S. Cl. ................................. 318/721; 318/722; 318/723
[58] Field of Search .............. 318/138, 254, 439, 700, 318/702, 705, 714, 715, 720, 721, 722, 723

[56] References Cited

U.S. PATENT DOCUMENTS

| | | | |
|---|---|---|---|
| 4,160,939 | 7/1979 | Damouth et al. | 318/723 |
| 4,223,261 | 9/1980 | White | 318/721 |
| 4,246,528 | 1/1981 | Nakajima | 318/721 |
| 4,384,242 | 5/1983 | Ono | 318/721 |
| 4,389,606 | 6/1983 | Detering | 318/721 X |
| 4,496,893 | 1/1985 | Nakano et al. | 318/721 |
| 4,511,834 | 4/1985 | Studtmann | 318/705 |
| 4,608,527 | 8/1986 | Glennon et al. | 318/723 X |
| 4,629,958 | 12/1986 | Kurakake et al. | 318/701 X |
| 4,792,741 | 12/1988 | Matsuo et al. | 318/723 X |
| 4,837,493 | 6/1989 | Maeno et al. | 318/721 X |

Primary Examiner—Bentsu Ro
Attorney, Agent, or Firm—Antonelli, Terry, Stout & Kraus

[57] ABSTRACT

A torque angle control system for maintaining a predetermined torque angle in a synchronous motor having a speed command conversion circuit (10) for converting a speed command signal to a synchronous motor control signal, correcting the synchronous motor control signal and generating a fundamental signal related to the corrected synchronous motor control signal, position sensors (26) for sensing the rotational position of a rotor of the synchronous motor (20) and a comparator (30) for comparing the fundamental signal to a rotor position signal and outputting a correction signal to the speed command conversion circuit (10) for correcting the synchronous motor control signal to maintain a predetermined torque angle in the synchronous motor (20).

8 Claims, 2 Drawing Sheets

TORQUE ANGLE CONTROL SYSTEM FOR CONTROLLING THE TORQUE ANGLE OF A PERMANENT MAGNET SYNCHRONOUS MOTOR

TECHNICAL FIELD

The present invention relates to control systems for controlling and stabilizing the operation of a synchronous motor. More particularly, the present invention relates to a torque angle control system for maintaining a predetermined torque angle in a permanent magnet synchronous motor.

BACKGROUND ART

Synchronous motors may be of three different types which are the wound rotor (electromagnetic) type, the permanent magnet rotor type or the brushless type. However, in all types of synchronous motors, a rotating magnetic stator field produced by a set of stator windings causes the rotor to rotate in step or in synchronism with the stator field. In other words, the rotational frequency of the rotor equals the stator field frequency.

Essentially, synchronous motors operate by causing the magnetic poles of the rotor to be attracted to the revolving stator field. Thus, the magnetic poles of the rotor follow the revolving stator field in synchronism thereto, thereby producing a torque on the shaft of the rotor.

The torque angle of a synchronous motor is a measure of the angle between the applied stator voltage and the back EMF induced in the stator. The torque angle of the synchronous motor increases with increasing mechanical load and decreases with decreasing mechanical load. If a large mechanical load is applied to the motor, then the torque angle of the synchronous motor increases to a point where the motor stalls and synchronous operation is lost.

Thus, by maintaining the torque angle within a range of stability between zero and the angle at which the motor stalls, efficient synchronous operation of the motor is maintained. Typically, synchronous motors are designed to maintain a predetermined torque angle within the stability range at which the motor operates most efficiently considering such factors as expected load, cooling, desired speed, etc.

Mechanical load or load torques translate into a torque applied to the shaft of a rotor. Load torques are steady state in nature and if great enough can cause the torque angle to exceed the stability range of the synchronous motor thereby resulting in a loss of synchronous operation in the synchronous motor.

Transient torques result from fluctuations in the supply voltage or regions of instability existing in the torque speed envelope of the synchronous motor. The fluctuations in supply voltage or regions of instability cause the torque angle of the synchronous motor to increase to a point where synchronous operation of the synchronous motor is lost. Particularly, the rotor of a synchronous motor may, for example, begin to oscillate or hunt in an attempt to remain in synchronism with the stator field when sudden load torque changes occur. The oscillations may become so great that the torque angle of the synchronous motor may begin to exceed the range of stability of the synchronous motor, causing a loss of synchronous operation of the synchronous motor.

Various systems have been proposed for controlling and stabilizing the operation of a synchronous motor to minimize the effect of load torques and transient torques which cause the torque angle of a synchronous motor to vary from a predetermined angle within the stability range of the synchronous motor.

One conventional approach is to make use of a damper winding which is a shorted winding on the rotor. Damper windings tend to maintain motor synchronism by generating a torque in the rotor counteracting the applied load and transient torques. Damper windings tend to reduce the magnitude of any load or transient torques applied to the synchronous motor.

However, damper windings suffer from various disadvantages, namely, they increase the size and weight of the synchronous motor, and the damper windings reduce the efficiency of the synchronous motor, thereby consuming more power and making the synchronous motor harder to cool.

Another approach to eliminating the effects of load and transient torques on a synchronous motor is to provide an electronic synchronous motor control system for electronically controlling the synchronism of a damperless synchronous motor. Electronic synchronous motor control systems eliminate the use of damper windings because all necessary damping functions are performed electronically. An example of a conventional electronic synchronous motor control system is shown in FIG. 1.

The conventional system disclosed in FIG. 1 includes a voltage controlled oscillator 30, logic circuitry 32, a power inverter 34 and a synchronous motor 36.

As shown in FIG. 1, a speed command signal is supplied to the voltage controlled oscillator 30 which outputs a frequency signal related to the speed command signal. The frequency signal is applied to the logic circuitry 32 which outputs a pulse width modulated signal in response to the frequency signal and the speed command signal.

The pulse width modulated signal output by the logic circuitry 32 is provided to the power inverter 34 which outputs a variable voltage variable frequency signal for controlling the synchronous motor 36. The conventional system shown in FIG. 1 maintains synchronism of the synchronous motor by varying the voltage and frequency of the signal applied to the synchronous motor thereby maintaining the torque angle of the synchronous motor 36 at a predetermined value within the stability range.

Electronic synchronous motor control systems which control the synchronism of a damperless synchronous motor tend to be complex and expensive to construct. Further, such systems do not accurately detect the position of the rotor of the synchronous motor relative to the stator magnetic field in order to effectively reduce the effects of the transient torques on the torque angle of the motor.

Another conventional type of electronic synchronous motor control system controls synchronism of a damperless synchronous motor by using a shaft position sensor which is mounted on the rotor shaft to determine the position of the rotor flux or magnetic field. In this conventional system, a signal from the shaft position sensor controls the inverter frequency output by a power inverter. The signal from the shaft position sensor controls the inverter frequency stator MMF (magneto motive force) from getting too far ahead of the rotor MMF. Thus, the stator and rotor magnetic fields are maintained sufficiently close together to hold the torque angle within the stability range despite the presence of transient torques or sudden load torque changes.

Although electronic synchronous motor control systems for controlling the synchronism of a synchronous motor by using a shaft position sensor which provides a signal to a power inverter may accurately detect the position of the rotor relative to the stator field, the complexity and expense of such systems significantly increase.

Further examples of conventional electronic synchronous motor control systems are shown in U.S. Pat. Nos. 4,160,939, 4,511,834 and 4,629,958. U.S. Pat. No. 4,160,939 discloses a motor speed control system utilizing a counter for providing a count which is inversely proportional to the speed of the motor to thereby control a voltage controlled oscillator whose frequency is used for driving the motor. U.S. Pat. No. 4,511,834 stabilizes the operation of a damperless synchronous motor by developing a control voltage which is a function of the motor voltage for rapidly adjusting the inverter frequency which drives the motor. U.S. Pat. No. 4,629,958 discloses a synchronous motor control system which compensates the sensed rotational angle of the synchronous motor by the actual velocity of the synchronous motor to output a command signal to an inverter which provides a signal for controlling the synchronous motor.

DISCLOSURE OF THE INVENTION

The present invention provides a torque angle control system for maintaining a predetermined torque angle in a permanent magnet synchronous motor. In the present invention, a synchronous motor control signal used to control the operation of a synchronous motor is varied depending upon a change in torque angle of the permanent magnet synchronous motor.

The present invention solves the above noted problems with regard to the conventional systems by providing a torque angle control system which maintains synchronous operation of a permanent magnet synchronous motor by maintaining a predetermined torque angle in the synchronous motor.

The torque angle control system of the present invention maintains a predetermined torque angle in a permanent magnet synchronous motor by providing a speed command conversion circuit for receiving a speed command signal. The speed command signal may be provided for example by a variable resistor device (not shown) which is used to vary the speed of the synchronous motor by varying a voltage signal. The speed command signal is corrected by the speed command conversion circuit in response to a correction signal and then converted into a synchronous motor control signal which controls the speed of operation of the synchronous motor. The synchronous motor control signal may be in the form of a pulse width modulated signal. The speed command conversion circuit also generates and outputs a fundamental signal which is related to the synchronous motor control signal. The fundamental signal represents only the envelope of the pulse width modulated signal representing the synchronous motor control signal.

A position sensor is provided in the present invention for sensing the rotational position of the rotor of the synchronous motor and outputting a rotor position signal. Position sensors are well known in the art and need not be discussed in detail in the present application.

In the present invention the frequency of the synchronous motor control signal is related to the expected position of the rotor of the synchronous motor due to the fact that the rotational frequency of the rotor matches the rotating frequency of the stator field which is related to the frequency of the synchronous motor control signal. Positional information obtained from the synchronous motor control signal is of the expected position of the rotor of the synchronous motor, whereas the position sensors detect the actual position of the rotor. Therefore, a comparison between the synchronous motor control signal and the rotor position signal provides an indication of the torque angle of the synchronous motor.

The rotor position signal is provided to a comparator along with the fundamental signal which is representative of the synchronous motor control signal. The comparator performs a comparison between the rotor position signal and the fundamental signal and outputs a torque angle signal indicative of the relationship between the fundamental signal which is related to the synchronous motor control signal and the rotor position signal. The torque angle signal may be supplied directly to the speed command conversion circuit as the correction signal or to a high-pass filter to remove the direct current (DC) component of the torque angle signal and then to the speed command conversion circuit as the correction signal. The correction signal is used by the speed command conversion circuit to correct the synchronous motor control signal. The correction signal is used to minimize the effects of the transient and load torques on the torque angle of the synchronous motor.

The correction signal is representative of the change in torque angle over and above the average torque angle during operation of the synchronous motor. As indicated above, unwanted load torque and transient torques cause the torque angle of a synchronous motor to exceed the stability range causing nonsynchronous operation of the synchronous motor.

The speed command conversion circuit includes a voltage controlled oscillator which receives the speed command signal and outputs a frequency signal, a phase shifter which shifts the phase of the frequency signal output by the voltage controlled oscillator in response to the correction signal which represents the change in torque angle of the synchronous motor and outputs a phase shifted frequency signal and logic circuitry which converts the phase shifted frequency signal into a pulse width modulated signal which is the synchronous motor control signal. The logic circuitry also generates and outputs the fundamental signal which is related to the pulse width modulated signal.

A power inverter is also provided in the present invention for receiving the pulse width modulated signal and outputting a variable voltage variable frequency signal to the synchronous motor for controlling operation of the synchronous motor.

BRIEF DESCRIPTION OF THE DRAWINGS

The features of the invention which are believed to be novel are set forth with particularity in the appended claims. The invention may be best understood, however, by reference to the following description in conjunction with the accompanying drawings in which:

BEST MODES FOR CARRYING OUT THE INVENTION

Figure 1:
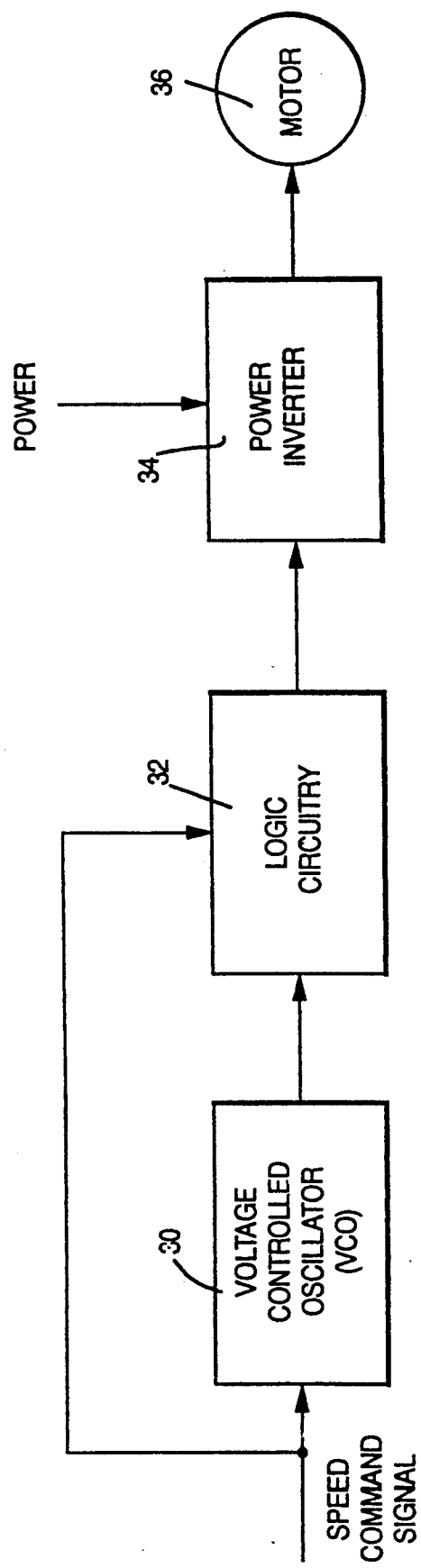
FIG. 1 illustrates an example of a conventional electronic synchronous motor control system.
Figure 2:
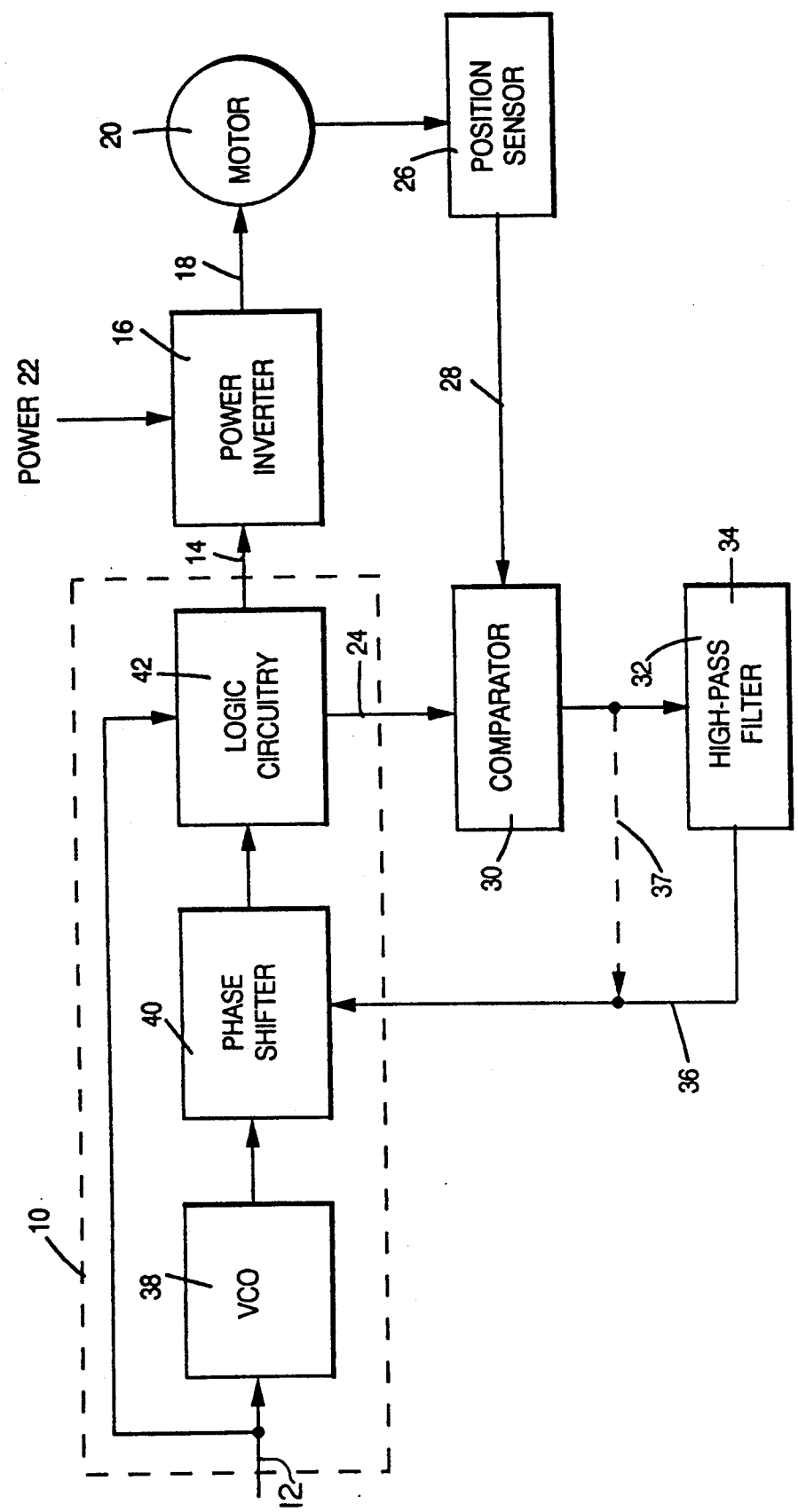
FIG. 2 schematically illustrates the torque angle control system of the present invention.

FIG. 2 illustrates the torque angle control system of the present invention.

In FIG. 2, a speed command conversion circuit 10 receives a speed command signal 12. The speed command signal 12 may be a varying voltage signal provided by, for example, a variable resistor device (not shown) designed to control the speed of a synchronous motor. The speed command conversion circuit 10 converts the speed command signal 12 into a synchronous motor control signal 14. The synchronous motor control signal 14 may be in the form of a pulse width modulated signal. The synchronous motor control signal 14 is provided to a power inverter 16 which converts the synchronous motor control signal into a varying voltage varying frequency signal 18 which is supplied to the synchronous motor 20. The varying voltage varying frequency signal 18 controls the speed of operation of the synchronous motor 20.

The power inverter receives power from a power source 22 and includes a plurality of switching circuits controlled by the synchronous motor control signal 14. The switching circuits of the power inverter 16, as is well known in the art, switches the power in such a manner to cause rotation of the rotor of the synchronous motor 20 by causing a rotating magnetic stator field in the synchronous motor. The magnetic stator field rotates at a speed indicated by the speed command signal 12.

The speed command conversion circuit 10 also outputs a fundamental signal 24 related to the pulse width modulated synchronous motor control signal 14. In the present invention the fundamental signal 24 includes only the envelope of the pulse width modulated synchronous motor control signal 14.

Position sensors 26 are also included in the present invention for detecting the position of the rotor in the synchronous motor 20. The position sensors 26 output a rotor position signal 28 indicating the position of the rotor of the synchronous motor 20.

A comparator 30 receives the fundamental signal 24 and the rotor position signal 28 and performs a comparison therebetween. The comparison performed by the comparator 30 results in a torque angle signal 32 indicating the torque angle of the synchronous motor 20. A high pass filter 34 receives the torque angle signal 32, removes the DC component of the torque angle signal 32 and outputs a correction signal 36 representing changes in torque angle of the average torque angle of the synchronous motor 20.

The correction signal 36 is supplied to the speed command conversion circuit 10 in order to correct the phase of the synchronous motor control signal 14. As shown by dotted line 37, the torque angle signal 32 may be supplied directly to the speed command conversion circuit 10 as the correction signal.

The frequency of the synchronous motor control signal 14 is related to the expected position of the rotor of the synchronous motor 20. The synchronous motor control signal 14 being a pulse width modulated signal is also related to the fundamental signal 24. The fundamental signal 24 includes the envelopes of the pulse width of the modulated signal of the synchronous motor control signal 14.

The position sensors 26 output a rotor position signal indicating the actual position of the rotor in the synchronous motor 20. Therefore, in the present invention, by comparing the expected position of the rotor indicated by the fundamental signal 24 which is related to the synchronous motor control signal 14 to the actual position of the rotor indicated by the position sensors 26, a torque angle signal 32 representative of the actual torque angle of the synchronous motor is determined. Furthermore, by eliminating the DC component of the torque angle signal 32, a correction signal 36 representing the change in torque angle relative to an average actual torque angle may be determined.

The speed command conversion circuit 10 includes a voltage controlled oscillator 38, a phase shifter 40 and a logic circuitry 42.

The voltage controlled oscillator 38 receives the speed command signal 12 and outputs a frequency signal related to the varying voltage of the speed command signal 12. The frequency signal from the voltage controlled oscillator 38 is provided to a phase shifter 40. The phase shifter 40 receives the correction signal 36 and performs a phase shift on the frequency signal from the voltage controlled oscillator 38 in response to the correction signal 36 to shift the phase of the synchronous motor control signal to a desired phase to provide a correction of the torque angle of the synchronous motor. The phase shifted frequency signal output by the phase shifter 40 is provided to logic circuitry 42.

Logic circuitry 42 also receives the speed command signal 12. The logic circuitry 42 outputs a pulse width modulated signal related to the phase shifted frequency signal from the phase shifter 40 and the speed command signal. The pulse width modulated signal output by the logic circuitry 42 is the synchronous motor control signal 14.

By use of the apparatus described above, the present invention controls the torque angle of a permanent magnet synchronous motor by detecting the change in torque angle of a synchronous motor from a predetermined torque angle and generating a correction signal 36 for correcting a synchronous motor control signal in response to the change in torque angle.

While the present invention has been described in terms of its preferred embodiment, it should be understood that numerous modifications may be made thereto without departing the spirit and scope of the invention as defined in the appended claims. For example, the present invention may be used in any application with a permanent magnet synchronous motor where the inherent disadvantages of a synchronous motor having damper windings is undesired. It is intended that all such modifications fall within the scope of the appended claims.

I claim:

1. A torque angle control system for maintaining a predetermined torque angle in a synchronous motor, comprising:

speed command converting means for receiving a speed command signal, correcting said speed command signal, converting said speed command signal to a synchronous motor control signal, outputting said synchronous motor control signal to control a synchronous motor, and outputting a fundamental signal related to said synchronous motor control signal;

position sensor means for sensing rotational position of a rotor of said synchronous motor and outputting a rotor position signal; and comparing means for comparing said fundamental signal to said rotor position signal and outputting a correction signal for correcting said speed command signal thereby maintaining a predetermined torque angle in said synchronous motor by maintaining a predetermined relationship between said synchronous motor control signal and said rotor position signal;

wherein said speed command converting means includes a voltage controlled oscillator for converting the speed command signal into a frequency signal, and a phase shifter for receiving said frequency signal from said voltage controlled oscillator, receiving said correction signal from said comparing means, phase shifting said frequency signal in response to said correction signal and outputting a phase shifted frequency signal.

2. A torque angle control system according to claim 1, wherein said speed command converting means further comprises:

logic circuitry which receives said phase shifting frequency signal from said phase shifter and said speed command signal and outputs a pulse width modulated signal as said synchronous motor control signal; and wherein said fundamental signal represents in envelope of said pulse width modulated signal.

3. A torque angle control system according to claim 2, further comprising:

a power inverter, connected to said speed command converting means, for receiving said synchronous motor control signal and outputting a varying voltage varying frequency signal to control the operation of said synchronous motor.

4. A torque angle control system according to claim 3, further comprising:

a high-pass filter connected between said comparing means and said speed command converting means for receiving said correction signal from said comparing means, filtering said correction signal and outputting a filtered correction signal to said speed command converting means;

wherein said correction signal represents a torque angle of said synchronous motor and said filtered correction signal represents a change in torque angle of an average torque angle of said synchronous motor.

5. A torque angle control system according to claim 2, further comprising:

a high-pass filter connected between said comparing means and said speed command converting means for receiving said correction signal from said comparing means, filtering said correction signal and outputting a filtered correction signal to said speed command converting means;

wherein said correction signal represents a torque angle of said synchronous motor and said filtered correction signal represents a change in torque angle of an average torque angle of said synchronous motor.

6. A torque angle control system according to claim 1, further comprising:

a power inverter, connected to said speed command converting means, for receiving said synchronous motor control signal and outputting a varying voltage varying frequency signal to control the operation of said synchronous motor.

7. A torque angle control system according to claim 6, further comprising:

a high-pass filter connected between said comparing means and said speed command converting means for receiving said correction signal from said comparing means, filtering said correction signal and outputting a filtered correction signal to said speed command converting means;

wherein said correction signal represents a torque angle of said synchronous motor and said filtered correction signal represents a change in torque angle of an average torque angle of said synchronous motor.

8. A torque angle control system according to claim 1, further comprising:

a high-pass filter connected between said comparing means and said speed command converting means for receiving said correction signal from said comparing means, filtering said correction signal and outputting a filtered correction signal to said speed command converting means;

wherein said correction signal represents a torque angle of said synchronous motor and said filtered correction signal represents a change in torque angle of an average torque angle of said synchronous motor.

* * * * *